US012212909B2

(12) United States Patent
Xu

(10) Patent No.: US 12,212,909 B2
(45) Date of Patent: Jan. 28, 2025

(54) SPEAKER ILLUMINATION APPARATUS AND METHOD

(71) Applicant: VERTICAL WWT LLC, Gilbert, AZ (US)

(72) Inventor: Sensheng Xu, Gilbert, AZ (US)

(73) Assignee: Vertical WWT LLC, Gilbert, AZ (US)

( * ) Notice: Subject to any disclaimer, the term of this patent is extended or adjusted under 35 U.S.C. 154(b) by 208 days.

(21) Appl. No.: 18/003,307

(22) PCT Filed: Jun. 29, 2020

(86) PCT No.: PCT/CN2020/098773
§ 371 (c)(1),
(2) Date: Dec. 23, 2022

(87) PCT Pub. No.: WO2022/000163
PCT Pub. Date: Jan. 6, 2022

(65) Prior Publication Data

US 2023/0254616 A1 Aug. 10, 2023

(51) Int. Cl.
*H04R 1/02* (2006.01)
*F21V 33/00* (2006.01)
(Continued)

(52) U.S. Cl.
CPC ......... *H04R 1/028* (2013.01); *F21V 33/0056* (2013.01); *H04R 7/12* (2013.01); *H04R 7/18* (2013.01); *H04R 9/06* (2013.01); *F21Y 2103/33* (2016.08); *F21Y 2115/10* (2016.08); *H04R 2400/11* (2013.01)

(58) Field of Classification Search
CPC . H04R 1/028; H04R 7/12; H04R 7/18; H04R 9/06; H04R 2400/11; F21V 33/0056; F21Y 2103/33; F21Y 2115/10
See application file for complete search history.

(56) References Cited

U.S. PATENT DOCUMENTS 10,462,546 B2 10/2019 Proni et al.
2004/0175014 A1 9/2004 Liu
(Continued)

FOREIGN PATENT DOCUMENTS

CN 104011458 A 8/2014
CN 210781240 U 6/2020
(Continued)

OTHER PUBLICATIONS

International Search Report & Written Opinion received in PCT Application No. PCT/CN2020/098773, dated Apr. 1, 2021, in 10 pages.

*Primary Examiner* — Tuan D Nguyen
(74) *Attorney, Agent, or Firm* — Knobbe Martens Olson & Bear, LLP

(57) ABSTRACT

An audio speaker can include a lighted visual feature positioned within the speaker. For example, illuminators can be positioned around the circumference of the speaker interior, underneath a surround connecting a speaker cone to a mounting flange of a rigid speaker frame. The surround can be formed from translucent material, thereby enhancing visual effects as illuminators radiate through the surround, e.g., in a controlled or coordinated manner. Thus, audio and visual effects can be merged and provided by a single speaker device.

11 Claims, 5 Drawing Sheets

(51) Int. Cl.

| | |
|---|---|
| ***H04R 7/12*** | (2006.01) |
| ***H04R 7/18*** | (2006.01) |
| ***H04R 9/06*** | (2006.01) |
| *F21Y 103/33* | (2016.01) |
| *F21Y 115/10* | (2016.01) |

(56) References Cited

U.S. PATENT DOCUMENTS

| | | | | |
|---|---|---|---|---|
| 2008/0225510 | A1 | 9/2008 | Rocha | |
| 2018/0035187 | A1* | 2/2018 | Cook | F21V 33/0056 |
| 2019/0149902 | A1 | 5/2019 | Cook et al. | |
| 2019/0327561 | A1* | 10/2019 | Qiu | H04R 1/023 |

FOREIGN PATENT DOCUMENTS

| | | | |
|---|---|---|---|
| JP | 2001095074 | A | 4/2001 |
| WO | WO 2010/130676 | A1 | 11/2010 |
| WO | WO 2014/194593 | A1 | 12/2014 |
| WO | WO 2022/000163 | A1 | 1/2022 |

* cited by examiner

SPEAKER ILLUMINATION APPARATUS AND METHOD

PRIORITY INFORMATION AND CROSS-REFERENCE TO RELATED APPLICATIONS

This application is a 371 of International Patent Application No. PCT/CN2020/098773, titled SPEAKER ILLUMINATION APPARATUS AND METHOD, filed on Jun. 29, 2020. Moreover, any and all applications for which a foreign or domestic priority claim is identified in the Application Data Sheet as filed with the present application are hereby incorporated by reference under 37 CFR 1.57. The entire contents of each of the above-listed items is hereby incorporated into this document by reference and made a part of this specification for all purposes, for all that each contains.

FIELD

The present systems and methods relate to illumination in an audio speaker.

BACKGROUND

Audio speakers can be enhanced by visual aspects, including illumination. This illumination can have improved manufacturing efficiency, structural placement, durability, aesthetic appeal, and other features.

DETAILED DESCRIPTION

Audio speakers can have a frame, a transducer supported by the frame that converts electrical signals to movement, and an amplifying structure attached to the transducer that converts the movements into acoustic waves that travel through the surrounding air. The frame can be configured to support illuminating features that enhance the sensory effect of the audio speakers. When audio signals are transformed and encoded into electrical signals, an analogous—but reversed—structure can be used. Thus, a transducer (in a microphone) can vibrate from acoustic waves and create corresponding electrical signals. A speaker reverses this process and can amplify those signals by creating corresponding, but larger amplitude, acoustic waves.

Figure 1:
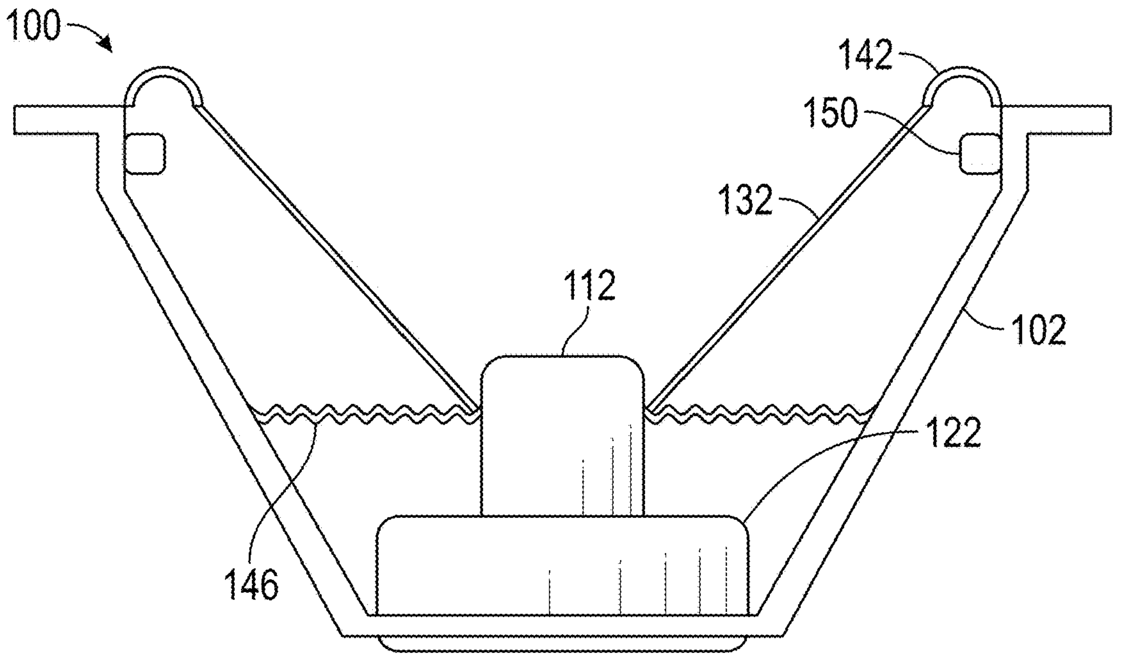
FIG. 1 shows a schematic speaker cross-section slice illustrating an internal illumination feature.

FIG. 1 shows various basic structures of a speaker 100. The frame 102 is generally a rigid, supporting structure configured to provide a secure platform for the speaker and position its other parts relative to each other. A transducer can include a rigid vibrator 112. Its vibration can be induced and controlled by a generally surrounding structure 122. The surrounding structure 122 can include a torus stationary magnet and the vibrator 112 can include a conductive coil within the void of the torus such that they collectively form an electromagnet structure. As electrical signals are fed to the conductive coil, resulting magnetic fields can interact with the magnetic fields of the stationary magnet in the surrounding structure 122, causing the vibrator to move back and forth within the torus. An amplifying structure can be attached to the vibrator 112 and can include a diaphragm 132 directly connected to the vibrator 112. It can form a cone shape and diverge outwardly from the vibrator 112 such that it forms acoustic waves that travel away from the speaker 100.

The amplifying structure can have resilient, non-rigid portions that help support and constrain the movements of the vibrator 112 and the diaphragm 132. For example, an upper resilient suspension 142 can surround the diaphragm 132 and connect it to the rigid frame 102. A lower resilient suspension 146 can connect the vibrator 112 and/or another portion of the diaphragm to the rigid frame 102. A portion of the rigid frame can be partially surrounded by 132, 146, and 142, as illustrated here, to form an enclosed area having an illumination feature 150. These surrounding structures can reflect, absorb, transmit, scatter, and/or diffuse light emanating from the illumination feature 150.

In some preferred embodiments, an upper resilient suspension 142 is formed from translucent material and an illumination feature 150 is located near that upper suspension 142, thus allowing light from underneath to cause it to glow. The frame 102 can be structured to support the illumination feature, thereby enhancing this effect and securing any circuitry and lights to be positioned near the upper suspension 142, improving efficiency and reducing wasted energy through internal scattering and reflection. In some embodiments, internal scattering and reflection are beneficial to diffuse light from individual emitters, thereby improving consistency and reducing variation in illumination across a surface of a translucent suspension 142. The position of an illumination feature within an interior volume, the relative angles (e.g., of surfaces of the rigid frame), and the direction(s) light is emitted, can be balanced and adjusted to achieve an optimized illumination result. Because electrical signals can drive the vibrator 112 and separate (or related) electrical signals can power an illumination feature 150, it can be advantageous to separate these two features, thereby reducing electrical interference between these signals. By locating an illumination feature near the top of a speaker, installation can be facilitated. A frame 102 can have receiving and supporting features (e.g., a flat surface, a shelf or ledge, a customized formed structure, etc.) to receive, secure, and support an illumination feature. For example, a speaker may cause vibration through its inherent functions, so secure attachment may be especially helpful in this acoustic environment where loose parts and unintended vibrations may cause problems.

Figure 2:
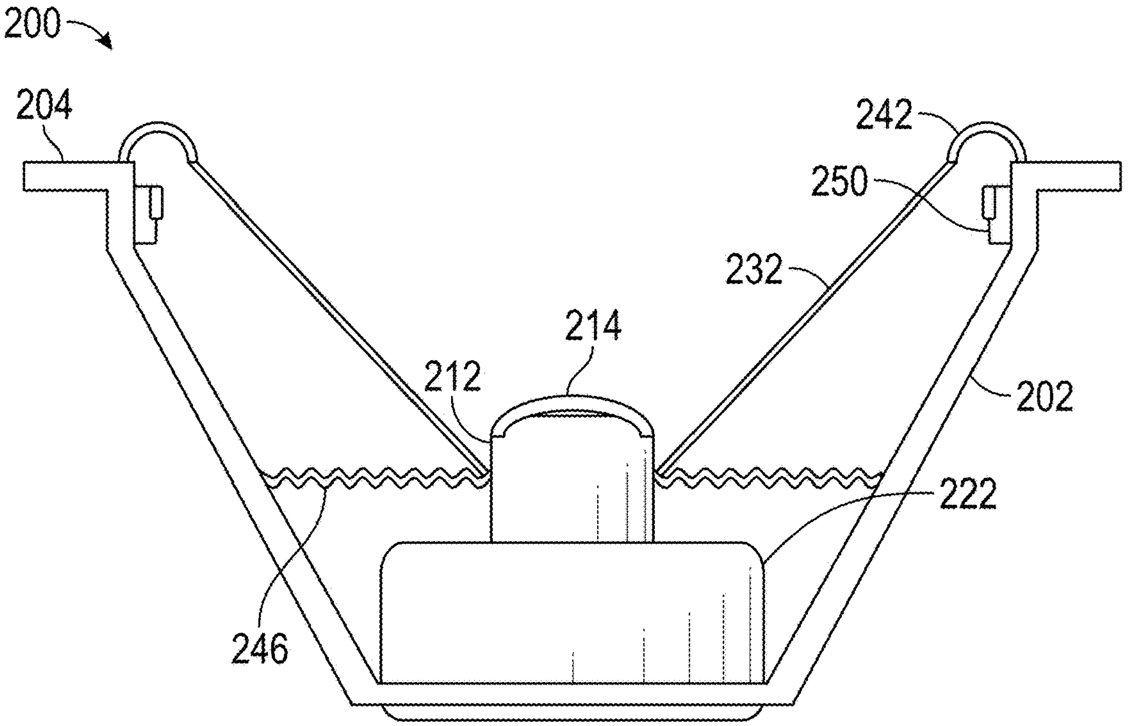
FIG. 2 shows a schematic speaker cross-section slice with a ring having light-emitting diodes positioned near the upper perimeter.

FIG. 2 shows speaker structures that can fill the roles, functions and principles described above. Here, a speaker basket 202 forms a rigid support, a magnet and housing 222 houses a voice coil 212, a cone 232 extends from a spider 246 at the voice coil 212 to a surround 242 at the opening of the speaker 200. The basket 202 supports an LED ring 250 that can provide electrical and structural support to a series of light-emitting diodes ("LEDs") that are positioned beneath the surround 242. An illumination feature can comprise an LED printed circuit board (LED PCB) or LED light strips, for example. One or more of the LEDs can be side-emitting. The voice coil 212 can be a hollow tubular structure with a dust cap, for example. Thus, an audio speaker can include a lighted visual feature positioned within the speaker. For example, illuminators can be positioned around the circumference of the speaker interior, underneath a surround connecting a speaker cone to a mounting flange of a rigid speaker frame. The surround can be formed from translucent material, thereby enhancing visual effects as illuminators radiate through the surround, e.g., in a controlled or coordinated manner. Thus, audio and visual effects can be merged and provided by a single speaker device.

FIGS. 1 and 2 show that an illumination feature can be adjacent to an inward-facing surface of an upper circumference of a basket 202, thereby illuminating a region immediately underneath the surround 242. The surround 242 can be formed from translucent material and connected to the basket 202 and the cone 232, permitting illumination of and through the surround 242. Although not explicitly illustrated in the schematics of FIGS. 1 and 2, an inwardly-protruding circumferential ledge in the basket 202 can be configured to provide support and alignment for an illumination feature (e.g., the LED ring 250, which can be a ring-shaped circuit board or circuit-supporting structure with periodically-spaced light bulbs, LEDs, or other illuminating elements. The LED ring 250 can have a connector and power distribution features configured to feed electrical power to its illuminating elements. A controller can be housed on the ring 250 (or elsewhere supported by the basket 202), the controller configured to provide illumination signals. For example, a controller may coordinate illumination signals with audio signals, associating intensity, timing, and/or meter between the two signal streams. Some embodiments can illuminate in a static manner, while others may change colors, intensity, or illuminated/dark status. This may be achieved in a manner related to audio signals.

A translucent surround can be formed from strong but resilient materials such as synthetic rubber. For example, nitrile rubber, Buna-N rubber, NBR, acrylonitrile butadiene rubber can be used (trade names include Perbunan, Nipol, Krynac and Europrene). Thermoplastic elastomers can also be used, such as Santoprene thermoplastic vulcanizates or TPV (e.g., dynamically vulcanized EPDM (ethylene propylene diene monomer) rubber in a thermoplastic matrix of polypropylene (PP)). Styrene-Butadiene rubber or SBR can be used, as well as foam rubber, paper, etc. Moreover, as shown in later figures, a ledge or lip can be provided on the basket 202 that supports and positions and LED ring 250 in a manufacturing process. Some or all of this ledge can be integrally formed, molded as part of the basket, and/or added as a separate part in a manufacturing process.

Figure 3:
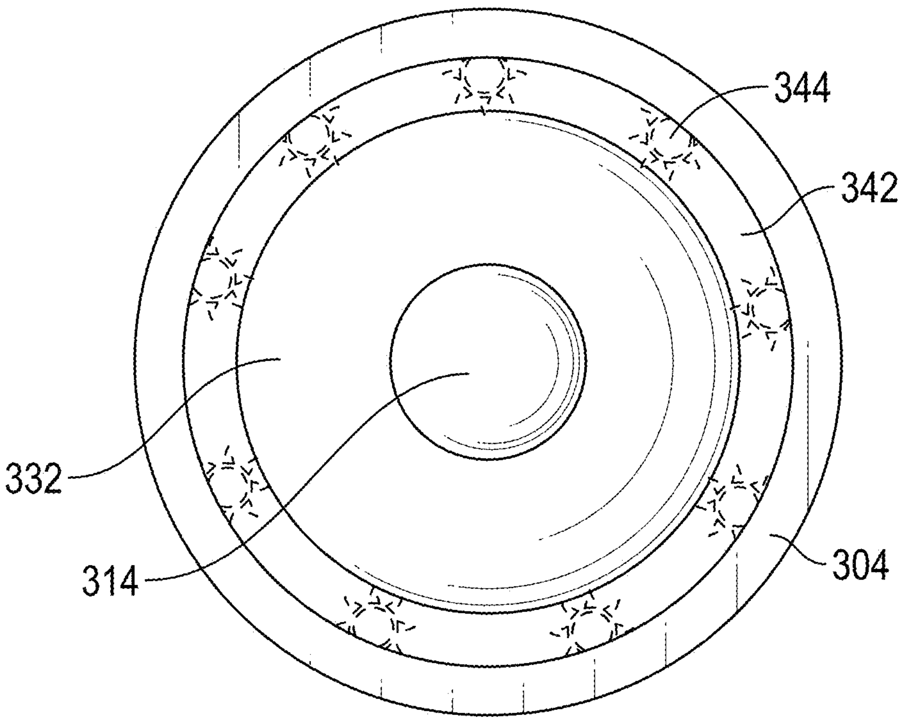
FIG. 3 shows a plan view of a speaker with schematic illumination zones shining through a translucent surround.

FIG. 3 shows a plan view of a speaker with characteristics similar to those described in FIGS. 1 and 2. FIG. 3 has an upper flange 304, which generally surrounds the circumference of the speaker and can connect it to a casing or cabinet for example. A surround 342 is shown and can have translucent properties that allow illumination to come from underneath. The surround 342 can include various illumination zones 344 as illustrated, and these can correspond to individual illuminators or to groups of illuminators (e.g., a cluster having LEDs of various colors, for example). It can be helpful to have between 9 and 30 individual illuminators or groups, for example. A cone 332 may or may not allow light to penetrate from within the speaker. A dust cap 314 is also shown toward the center of this view of a speaker. In some embodiments, a surround 342 can be formed from a material that is thick enough to mask the individual illumination zones 344 such that the surround 342 appears to illuminate in a uniform fashion, despite discrete particular illuminators being localized to specific illumination zones 344. Thus, a surround 342 can light up with one or more colors to form a consistently-illuminated ring. An additional light diffuser can form part of an illumination ring, such that even prior to installation of a surround, the light can diffuse and radiate uniformly from a plastic translucent ring, for example. The illuminators can be controlled to synchronize with sound events, or to only illuminate when a speaker is powered. The illuminators can have different shapes, sizes, and/or colors. The illuminators can be capable of emitting a range of colors, which may be controlled by a one or more control units associated with the speaker, an audio system, or individual LEDs.

Illumination of a surround may be preferable to or more feasible than illumination of a cone. For example, cone materials with acceptable acoustic properties can be generally less translucent. Surround materials can be resilient and subject to fewer acoustic requirements. Surround materials can be primarily selected or engineered to maintain a permanent but resilient connection with the wide portion of a cone 332. A surround material that is thick enough to produce a uniformly illuminated appearance may also tend to attenuate energy transmission. Positioning illuminators near the underside of a surround 442 can address this potential problem. Number and placement of illuminators (e.g., light bulbs or LEDs) can be selected to establish a uniform glow through a surround. Less intense but more numerous LEDs may be desirable for this reason. Alternatively, more intense but less numerous LEDs may be more efficient. Uniform periodic spacing between illuminators is often beneficial for establishing a consistent glow in the surround.

Figure 4:
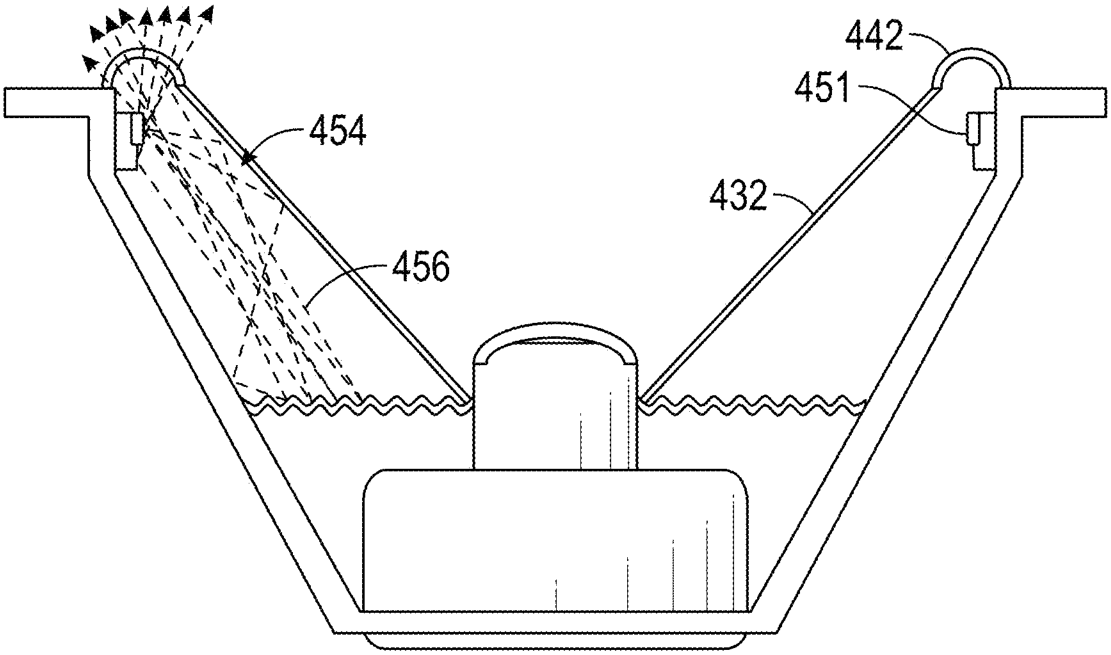
FIG. 4 shows how light can travel within a speaker from an illuminator and ultimately radiate from a surround.

FIG. 4 shows how illuminators 451 can emit light (e.g., rays 456). The light can reflect, scatter, or absorb internally throughout an internal reflection zone 454. Some light is emitted through the translucent surround 442. In some embodiments, a cone 432 does not allow light to pass directly through to the outside of the speaker. Some cones are formed from black paper or fabric material that tends to block light. Energy attenuation prior to light emission from the internal reflection zone 454 can be reduced by positioning illuminators 451 immediately beneath the translucent surround 442. This position can also allow for better heat dissipation from illuminators. A speaker driver can generate heat or be sensitive to extraneous heat effects. Thus, locating illuminators (and related circuitry) at the top perimeter of the speaker can reduce these potential problems as heat is radiated out and away from the speaker, rather than remaining inside. Moreover, the direction of light emission can be selected to enhance optical effects. Some LEDs may perform best, for example, when they primarily direct light out away from the ring such that reflected (e.g., indirect) light ultimately shines through a surround 442. In some situations, it is more efficient and desirable for an illuminator to shine directly toward the surround and minimize extraneous reflections. This may depend on the surround material, the tendency for the illuminator to also produce infrared radiation, the color, and the number and arrangement of illuminators with respect to each other and the surround itself.

Positioning an illuminator as shown in FIGS. 1-4 can also limit speaker manufacturing costs. For example, installing a ring near the top perimeter of the speaker can allow manufacturing personnel or machinery to access the installation point without as much risk of interference with the speaker driver, which may already be installed. This position can also allow installation of an illumination ring to occur on the basket 202 or rigid frame 102 itself prior to assembly or installation of other speaker features (e.g., a rigid vibrator 112, a diaphragm 132 a surrounding structure 122, a lower resilient suspension 146, or an upper resilient suspension 142 (FIG. 1). An LED ring 250 (FIG. 2) can be installed as a first step on the basket 202 itself, and then the remaining speaker components can be configured around it, within the basket 202. An electrical connector can be configured to easily reach an illumination feature installed here, because power is often supplied from an external source, nearer the perimeter of a speaker. A power cord can be supported by the rigid frame of a basket 202, so it is convenient if the LED ring 250 is also located on the basket 202.

Figure 5:
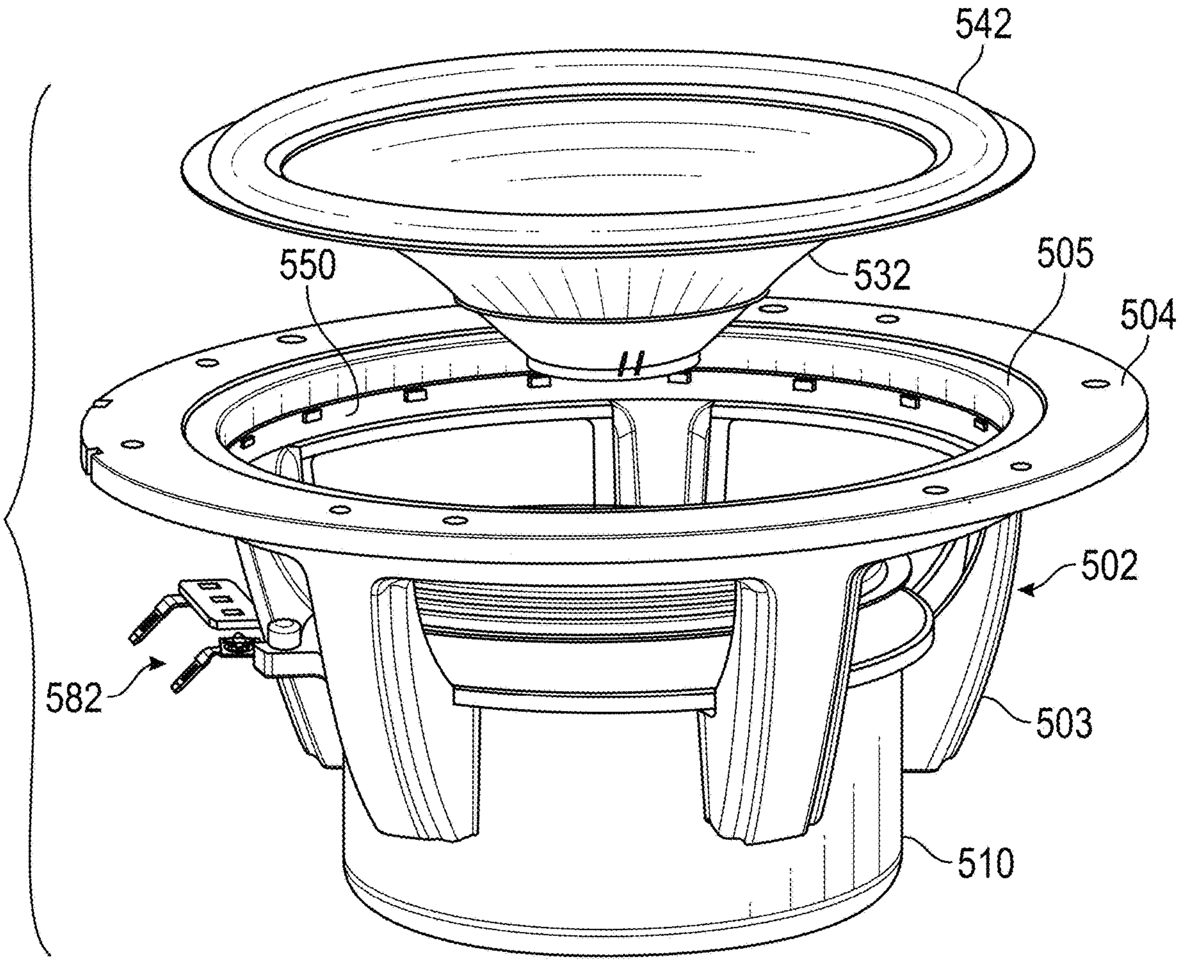
FIG. 5 shows a partially-exploded perspective view of a speaker having internal illumination and a cone with surround attached.

FIG. 5 shows a perspective, partially-exploded view of a speaker having an interior illumination feature in the form of an LED ring 550. A surround 542 is shown above its installed position, connected to a cone 532. A surround seat 505 provides an alignment function and a flat surface to which the surround 542 can be adhered during installation or manufacture. An upper flange 504 can contain bored holes, configured to receive cabinet securement screws, for example. The basket 502 also includes an upper flange 504 and a structural strut 503 connecting this flange 504 to a basket base 510, which can be configured to hold a speaker driver (e.g., a voice coil, a stationary magnet, surrounding containment structures, and/or electronic components, wires, or connections). Connectors and support structures 582 can be positioned to the side of the speaker (e.g., in a gap between adjacent struts 503). For example, such connectors can be positioned for access to both electrical features of an audio driver and electrical features of an optical driver, controller, ballast, or circuit. Positioning connectors at an intermediate position can improve access for electrical cords or leads, especially when a basket uses spaced-apart features such as the struts 503.

Figure 6:
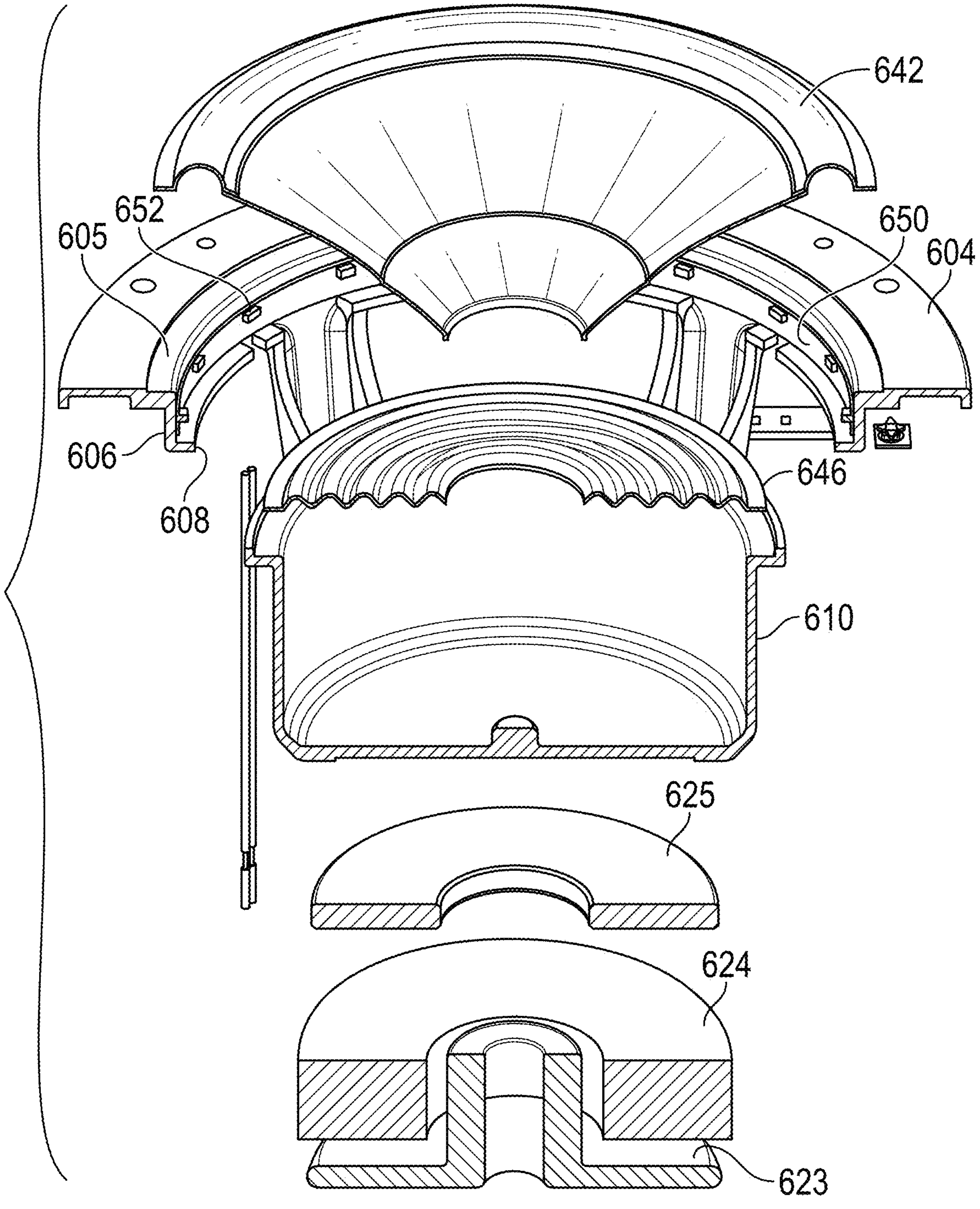
FIG. 6 shows an exploded, perspective section view of a speaker with internal perimeter illumination below the surround.

FIG. 6 (as with FIGS. 1-4), shows an example of a system for illuminating a speaker. As explained further below, this system includes each of the following: a rigid speaker support basket with an outer circumferential flange configured for securement to a cabinet; a downwardly-extending circumferential surface extending from the outer circumferential flange and having a supporting feature configured to retain an illumination structure; an illumination structure, comprising a supporting surface configured to interface with the basket's downwardly-extending circumferential surface and its supporting feature, light-emitting diodes distributed circumferentially about the illumination structure, and electrical leads connecting to each of the diodes; and an audio diaphragm, linked to the rigid speaker support basket near the outer circumferential flange by a resilient translucent surround, the surround configured to enclose a lighted interior volume of the speaker and at least partially transmit optical energy emanating from the light-emitting diodes of the illumination structure.

In particular, FIG. 6 shows an exploded section view of various speaker components and illumination feature. A magnet base 623 provides a supporting seat for a magnet 624. A post protrudes upwardly from the magnet base 623 through a hole in a washer-shaped magnet cap 625. These features can be stacked and nested within a basket base 610, which can be configured to hold them (e.g., with a protruding central feature and interior corners tapered inwardly as shown. The basket base 610 can provide a seat for a spider 646, as shown. A cone can connect to a voice coil (see FIG. 2), which is received into a magnetic gap between the central post of the magnetic base 623 and the central openings in the magnet 624 and its magnet cap 625. The voice coil can connect to one or more of the cone base and the spider 646.

FIG. 6 also shows upper basket structures that are configured to support and power an illumination feature (e.g., the LED ring 650, with LEDs 652). In particular, an upper flange 604 can be integrally or otherwise connected with a surround seat 605, a downward wall 606, and an inward lip 608. The surround 642 can seat in (and be adhered to) the surround seat 605 after an LED ring 650 has been installed on the downward wall 606. In some embodiments, the inward lip 608 assists in positioning, retaining, and/or supporting the LED ring 650. In cabinet installations, an LED ring 650 configured and positioned as shown in FIG. 6 is seated immediately within the round cabinet cutout for the illustrated speaker because the upper flange 604 is configured to seat relatively flush against the outer surface of a cabinet (or wall or vehicle feature into which the speaker is installed). This provides the illumination feature with a low acoustic profile, allowing sound generation by the cone and driver—and reverberation from other interior structures—resulting in sound wave emission, relatively unimpeded by an intervening illumination structure. Moreover, the presence of the inward lip 608 provides a low-profile (but circumferentially uniform) feature that can shield protruding LEDs from obstructing sound emission non-uniformly. At the same time, it can be very useful to provide illumination very near the surround 642 to maximize light emission and minimize internal absorption and scattering, thereby reducing power requirements for a similar visual effect. This conserves energy. Positioning an LED ring 650 as shown can also reduce a length of electrical connectors that may reach from a connector region (see FIG. 5, 582).

LEDs 652 can be spaced at intervals around an LED ring 650, and can comprise replaceable or installable modules. Alternatively, and entire LED ring 650 can form a replaceable module. For this purpose, adhesive securing a flat portion of the surround 642 to the surround seat 605 of the upper flange 604 can be temporarily or reversibly disengaged. Alternatively, an illumination feature can be installed or replaced from the back of the speaker by sliding it around a basket base 610. For this purpose, it can be advantageous to minimize the size of an inward lip 608, not include such a lip, provide for detachable struts 503, and/or use an illumination support structure that does not form a complete ring.

Figure 7:
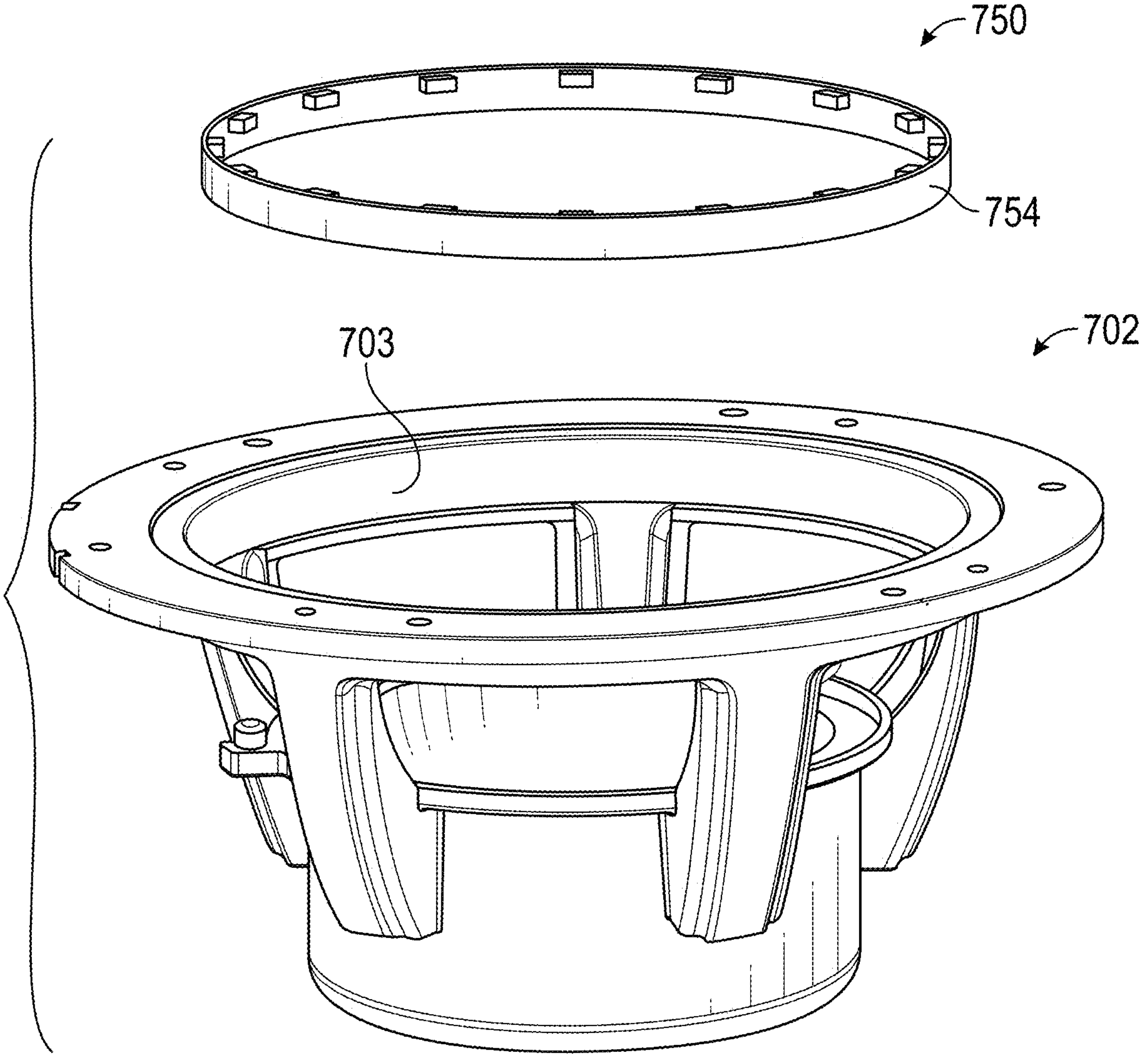
FIG. 7 shows an exploded perspective view of a rigid support structure and illumination feature with a ring shape.

FIG. 7 provides an example of a supporting frame 702 and an illumination feature 750. The supporting frame 702 can have a flat, inward-facing surface or face 703, and the illumination feature can have an outer-facing surface 754. The face 703 can be sized and configured to receive the illumination feature 750 such that its surface 754 seats flush against the face 703. Moreover, the face 703 can include securement features such as screw holes, snap structures, etc. to permanently or reversibly secure the illumination feature 750 in place.

ASPECTS OF THE DISCLOSURE

Aspects of the disclosure include a system for illuminating a speaker. For example, the system can comprise a rigid speaker support basket having an outer circumferential flange configured for securement to a cabinet. The system can also comprise a downwardly-extending circumferential surface extending from the outer circumferential flange and having a supporting feature configured to retain an illumination structure. The system can further comprise the illumination structure, which can have a supporting surface configured to interface with the basket's downwardly-extending circumferential surface and its supporting feature, light-emitting diodes distributed circumferentially about the illumination structure, and electrical leads connecting to each of the diodes. The system can further comprise an audio diaphragm, linked to the rigid speaker support basket near the outer circumferential flange by a resilient translucent surround, the surround configured to enclose a lighted interior volume of the speaker and at least partially transmit optical energy emanating from the light-emitting diodes of the illumination structure.

In other aspects, an audio loudspeaker apparatus with optical features can comprise a basket forming a rigid supporting structure. The basket can have an upper flange at an outer circumference of the supporting structure and configured for mounting to a surface adjacent to a round speaker hole when the remainder of the basket is lowered into the speaker hole. The basket can also have a surround seat immediately within the circumference of the upper flange, the surround seat configured for adhesion to a resilient surround. The basket can also have a downward wall immediately within and below the surround seat, the downward wall forming a ring with an inward-facing face configured for supporting and securing an illumination ring. The apparatus can have an illumination ring configured for positioning generally flush against the face and underneath the surround, the ring having at least five illuminators that are regularly spaced along the circumference of the ring such that they emit light energy through the surround, thereby illuminating a circular portion of the outer surface of the audio loudspeaker. The loudspeaker can further comprise an inwardly-protruding lip at the base of the downward wall, the lip configured to assist in supporting, securing and aligning the illumination ring against the face of the ring formed by the downward wall.

In other aspects, a method of speaker illumination is provided. The method can comprise providing a rigid speaker support structure with an upper mounting flange and a lower receptacle, the flange and receptacle connected by at least one bridging feature. The method can include: positioning a magnetic speaker driver within the receptacle; connecting at least one portion of the speaker driver to a cone that extends generally upward and outward toward the flange; and providing a resilient translucent surround connected to the cone and bridging a gap between an upper circumference of the cone and an inner circumference of the flange. The method can also include positioning an illumination ring within two inches below the surround, the ring having illuminators positioned thereon and generally aligned with the surround to allow emitted radiation to pass through the surround to outside the speaker, above the flange of the speaker support structure.

TERMINOLOGY AND CONCLUSION

Reference throughout this specification to "some embodiments" or "an embodiment" means that a particular feature, structure or characteristic described in connection with the embodiment is included in at least some embodiments. Thus, appearances of the phrases "in some embodiments" or "in an embodiment" in various places throughout this specification are not necessarily all referring to the same embodiment and may refer to one or more of the same or different embodiments. Furthermore, the particular features, structures or characteristics can be combined in any suitable manner, as would be apparent to one of ordinary skill in the art from this disclosure, in one or more embodiments.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment.

A number of applications, publications, and external documents may be incorporated by reference herein. Any conflict or contradiction between a statement in the body text of this specification and a statement in any of the incorporated documents is to be resolved in favor of the statement in the body text.

Although described in the illustrative context of certain preferred embodiments and examples, it will be understood by those skilled in the art that the disclosure extends beyond the specifically described embodiments to other alternative embodiments and/or uses and obvious modifications and equivalents. Thus, it is intended that the scope of the claims which follow should not be limited by the particular embodiments described above.

What is claimed is:

1. A system for illuminating a speaker, the system comprising:

a rigid speaker support basket having an outer circumferential flange configured for securement to a cabinet;

a downwardly-extending circumferential surface extending from the outer circumferential flange and having a supporting feature configured to retain an illumination structure;

the illumination structure, comprising a supporting surface configured to interface with the basket's downwardly-extending circumferential surface and its supporting feature, light-emitting diodes distributed circumferentially about the illumination structure, and electrical leads connecting to each of the diodes; and an audio diaphragm, linked to the rigid speaker support basket near the outer circumferential flange by a resilient translucent surround, the surround configured to enclose a lighted interior volume of the speaker and at least partially transmit optical energy emanating from the light-emitting diodes of the illumination structure.

2. The system of claim 1, wherein the resilient translucent surround is formed from nitrile rubber.

3. The system of claim 1, wherein the resilient translucent surround is formed from TPV.

4. The system of claim 3, wherein the illumination further comprises a plurality of side-emitting LEDs configured and positioned to illuminate the resilient translucent surround.

5. An audio loudspeaker apparatus with optical features, the loudspeaker comprising:

a basket forming a rigid supporting structure, the basket having:

an upper flange at an outer circumference of the supporting structure and configured for mounting to a surface adjacent to a round speaker hole when the remainder of the basket is lowered into the speaker hole;

a surround seat immediately within the circumference of the upper flange, the surround seat configured for adhesion to a resilient surround;

a downward wall immediately within and below the surround seat, the downward wall forming a ring with an inward-facing face configured for supporting and securing an illumination ring; and the illumination ring configured for positioning generally flush against the face and underneath the surround, the ring having at least five illuminators that are regularly spaced along the circumference of the ring such that they emit light energy through the surround, thereby illuminating a circular portion of the outer surface of the audio loudspeaker.

6. The loudspeaker of claim 5, further comprising an inwardly-protruding lip at the base of the downward wall, the lip configured to assist in supporting, securing and aligning the illumination ring against the face of the ring formed by the downward wall.

7. The loudspeaker of claim 6, further comprising the resilient surround, wherein the surround is formed from translucent rubber.

8. The loudspeaker of claim 7, wherein the surround is formed from NBR.

9. The system of claim 7, wherein the surround is formed from TPV.

10. The system of claim 7, wherein the illumination ring further comprises a plurality of side-emitting LEDs positioned immediately below the surround, thereby configured to illuminate the surround when viewed from outside the loudspeaker.

11. A method of speaker illumination, the method comprising:

providing a rigid speaker support structure with an upper mounting flange and a lower receptacle, the flange and receptacle connected by at least one bridging feature;

positioning a magnetic speaker driver within the receptacle;

connecting at least one portion of the speaker driver to a cone that extends generally upward and outward toward the flange;

providing a resilient translucent surround connected to the cone and bridging a gap between an upper circumference of the cone and an inner circumference of the flange;

positioning an illumination ring within two inches below the surround, the ring having illuminators positioned thereon and generally aligned with the surround to allow emitted radiation to pass through the surround to outside the speaker, above the flange of the speaker support structure.

* * * * *